United States Patent [19]

Siitonen

[11] 4,081,056
[45] Mar. 28, 1978

[54] DRIVE MEANS FOR MOVING A TARGET FIGURE INTENDED FOR SPORTS SHOOTING

[76] Inventor: Anssi Pekka Siitonen, Lentokonetehtaantie 3 C 24, 33900 Tampere 90, Finland

[21] Appl. No.: 708,348

[22] Filed: Jul. 26, 1976

[51] Int. Cl.² .............................................. F03G 3/00
[52] U.S. Cl. ..................................... 185/6; 273/105.2
[58] Field of Search .......................... 185/6, 32, 7, 33; 242/100.2; 254/178; 273/105.2

[56] References Cited

U.S. PATENT DOCUMENTS

| 80,051 | 7/1868 | Bantel | 185/32 |
|---|---|---|---|
| 547,141 | 10/1895 | Crutchfield | 273/105.2 |
| 805,280 | 11/1905 | Foster | 254/178 |
| 1,136,251 | 4/1915 | McQueen | 185/32 |
| 1,318,467 | 10/1919 | Travell | 254/178 |

Primary Examiner—Benjamin W. Wyche
Assistant Examiner—Wesley S. Ratliff, Jr.
Attorney, Agent, or Firm—Haseltine, Lake & Waters

[57] ABSTRACT

The present invention concerns a drive means for moving a target figure for use in sports shooting, comprising a frame, a pulley and a power wheel mounted on support of the frame, a power shaft connected with the power wheel, an endless pulling rope, which passes around the pulley and the power wheel and whereto the figure has been affixed, a weight rope and a moving weight, the latter being connected with the power shaft by the aid of the weight rope, said components being so arranged that the moving weight may be suspended to be borne by the weight rope wound around the power shaft, whereby the gravity effect acting on the moving weight tends to move the figure by mediation of the weight rope, the power shaft and the power wheel and of the pulling rope. In accordance with the invention the power shaft further comprises a holding member for winding the weight rope around the power shaft in one direction of winding and, by changing direction by support gained from said holding member, in the opposite direction of winding so that the moving weight suspended from the weight rope will move the target figure first in one direction while the weight rope is unwound from the power shaft up to the holding member, and in the opposite direction while the rope is unwound from the power shaft after the holding member in the opposite direction.

6 Claims, 4 Drawing Figures

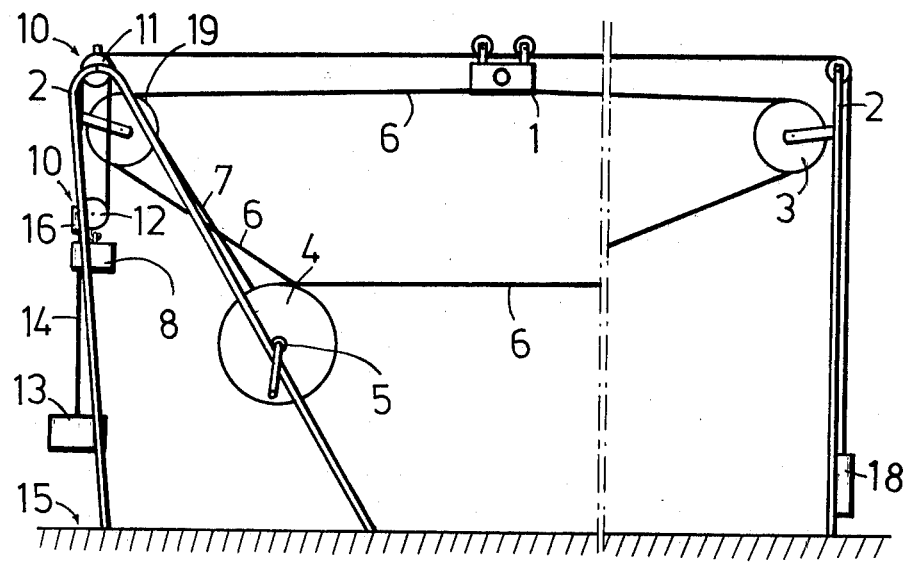
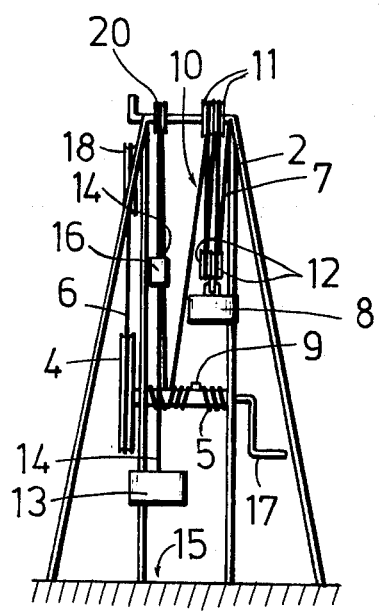
Fig. 1
Fig. 2

DRIVE MEANS FOR MOVING A TARGET FIGURE INTENDED FOR SPORTS SHOOTING

SUMMARY OF THE INVENTION

To put a target in motion is necessary in many kinds of sports shooting, and on big shooting ranges this is at present usually accomplished with the aid of electrical drive means. By using such, a uniform motion of the target figure is obtained, which is furthermore repeatable in constant manner. However, electricity is not available on the practice grounds in many instances. This is particularly the case with amateur sports shooters and with smaller shooting clubs, and the utilization of gravity will then be considered in the first place. In drive means of this kind e.g. inclined motion paths have been employed, the gravity pull acting on the figure itself being the motion-causing agent. Various working weights and centrifugal and other brakes have also been employed in order to achieve a uniform motion. Drive means for moving a target figure intended for sports shooting are known in prior art e.g. through the German Patents No. 142.544, 197.144 and 624.820. In all these drive means for a target figure intended for use in sports shooting known in prior art, serious drawbacks are inherent. It has particularly been difficult to produce a uniform motion; the same goes for the exact repeatibility of the motion in view of unchanged shooting conditions. Furthermore, it has been impossible to move the target figure in the horizontal plane in one direction and back into its starting position for the purpose of practicing fast, sequential rounds when drive means known at present and based on the utilization of gravity have been used.

The object of the present invention is to eliminate the drawbacks mentioned. The invention is characterized in that the power shaft comprises a holding member and that the weight rope can be wound around the power shaft in one direction of rotation and, by gaining support from the holding member, in the opposite direction so that the moving weight suspended from the weight rope first moves the target figure in one direction as the weight rope is unwound from the power shaft up to the holding member, and in the opposite direction as the rope is after the holding member unwound from the power shaft in the opposite direction. The said holding member may consist e.g. of a shoulder-like member from which the weight rope gains support, changing its direction of winding on the power shaft of the power wheel when it is wound around this shaft.

The drive means obtains its moving force from the moving weight suspended from the weight rope, this weight causing a pull on the weight rope. The tensile stress in the weight rope tends further to rotate the power shaft around which the pulling rope has been wound. The power shaft, which is connected to the power wheel, further causes this wheel to rotate, and the wheel in its turn sets the pulling rope passing around the pulley into a cycling motion and thereby sets into motion the target figure, which has been affixed to said pulling rope.

According to the invention the direction of winding of the weight rope on the power shaft changes at the holding member and by its action. Then, as the weight rope is unwound from the power shaft and at the same time rotates the power shaft in accordance with its unwinding direction, the direction of rotation of the power shaft also changes as the direction of winding of the weight rope changes at the holding member. This naturally causes the direction of motion of the power wheel and of the pulling rope to be reversed, whereby the target figure also reverses its motion to be opposite, along with the pulling rope. As a result the target figure first moves in one direction, thereafter returning from the terminal point of its path of motion to its starting point.

In an embodiment of the invention the weight rope has been connected to the power shaft by mediation of a block and tackle, which has been suspended from the frame by its upper pulley, and the moving weight has further been suspended from the lower pulley of the block and tackle. Hereby the range of motion of the target figure can be made wide enough while at the same time the range of motion of the moving weight is fairly narrow, that is the distance between the starting and terminal points of the path of the moving weight is comparatively short.

In another embodiment of the invention the drive means comprises an accelerating and braking weight connected with the power shaft by means of an accelerating and braking rope which can be wound around this shaft, so that the accelerating and braking weight imparts to the figure an accelerating motion at the initial end of its path, this acceleration stopping as the weight touches its base. Subsequent to the accelerating operation the accelerating and braking rope unwinds during a certain time from the power shaft and thereafter once again begins to be wound upon the power shaft in the opposite direction, whereby the weight is snatched up in the air towards the end of the motion and brakes the motion of the target figure, and makes it stop, and further imparts to it an accelerated return motion in the opposite direction.

In a third embodiment of the invention the mass of the moving weight has been chosen so that the gravity force substantially equals the constant speed drag of the drive means and the target figure combined.

The invention is descirbed in the following in detail with the aid of embodiment examples, with reference to the attached drawing, wherein:

FIG. 1 shows a drive means according to the invention, in elevational view,

FIG. 2 shows the same drive means, now viewed from one end,

Figure 3:
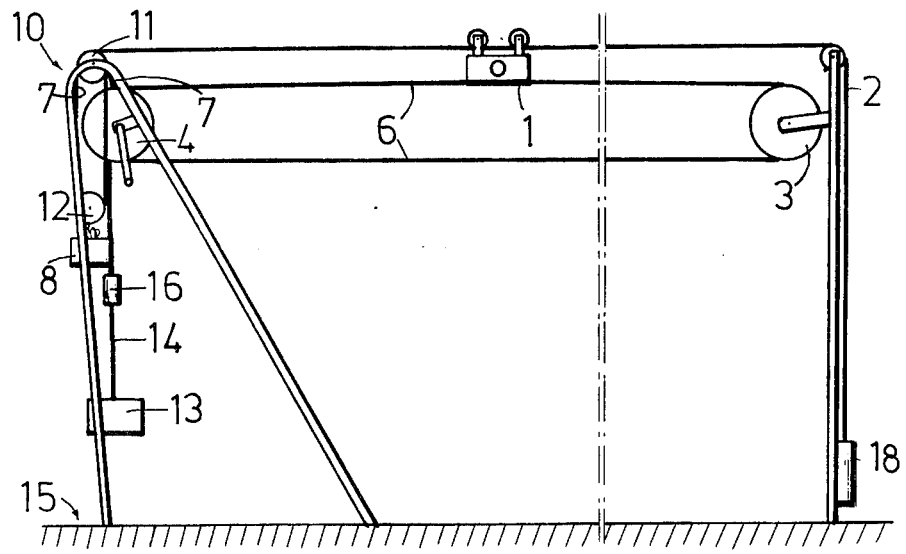
FIG. 3 shows another drive means according to the invention, in elevational view.

The drive means of the invention is intended, in the first place, to be used for moving the target FIG. 1 for purposes of sports shooting. The drive means comprises a pulley 3 and a power wheel 4 both rotatably carried in the frame 2 and around both of which passes an endless pulling rope 6 affixed to the target FIG. 1. To the power shaft 5 of the power wheel 4 there has further been attached a weight rope 7, from which the motion weight 8 has been suspended. The gravity action exerted on the moving weight 8 will then tend to rotate the power shaft 5, while the weight rope wound thereon unwinds, and this power shaft also sets the power wheel 4 in rotation and thereby sets the pulling rope into motion, which passes around the power wheel and the pulley 3. The target FIG. 1, being affixed to the pulling rope, will then be set in motion in the same direction.

According to the invention the power shaft 5 comprises a holding member 9, which in the embodiments presented in the figures consists of a cam-like shoulder. Owing to action of said holding member 9, the weight rope 7 may be wound on the power shaft 5 in such manner that its direction of winding changes at the holding member 9, where the rope finds support from the holding member. As a result hereof the direction of rotation of the power shaft 5 changes as the weight rope unwinds therefrom when the direction of winding of the rope wound around the shaft changes at the holding member 9. It follows that the target FIG. 1 also changes its direction of motion in accordance with the direction of rotation of the power shaft 5.

In the embodiments illustrated by FIGS. 1 to 4 the drive means also comprises a block and tackle 10, which has been affixed, supported by the frame 2, by its top pulleys 11. The moving weight 8 has been linked to the lower pulleys 12 of the block and tackle 10. The weight rope 7 has been affixed by one end to the frame and, passed through the block and tackle, by its other end to the power shaft 2. By action of the block and tackle 10, the motion transmitted to the target FIG. 1 from the moving weight 8 over the weight rope 7, the power shaft 5, the power wheel 4 and the pulling rope 6 has a considerably greater range than that of the moving weight. It is thus understood that the block and tackle 10 constitutes a step-up transmission between the moving weight 8 and the power shaft 5.

Furthermore, the drive means illustrated by FIGS. 1 to 4 comprise an accelerating and braking weight 13 with rope 14, this rope being wound upon the power shaft 5 in the same direction as the weight rope 7. Hereby the accelerating and braking weight imparts to the system an accelerated motion as this weight falls downwardly. As soon as the accelerating and braking weight 13 hits the support base 15, the moving weight 8, which has been chosen such that the gravity effect on its mass is substantially equivalent to the constant speed drag of the drive means and the target FIG. 1 combined, will continue to maintain the motion, without changing its speed. When the target FIG. 1 has arrived at the halfway point of its motion path, the accelerating and braking rope 14 has been fully unwound from the power shaft 3 and thereafter once more begins to wind upon it. When the target FIG. 1 approaches the terminal point of its path of motion, the accelerating and braking rope 14 becomes taut and snatches the weight 13 up, whereby now this weight, owing to the gravity action on its mass, begins to decelerate the motion. At the same time the weight rope 7 has become unwound from the power shaft 5 up to the holding member 9, whereby the direction of winding of the weight rope and thus also the direction of motion of the target FIG. 1 is reversed. The moving weight 8 is at this time at the halfway point of its travel from its upper end position towards the support base 15.

Subsequent to this, the motion sequence of the accelerating and braking weight 13 and of the rope 14, described above, starts once again, while at the same time the target figure moves from the terminal point of its path of motion back to its starting point, at first with an accelerating, then with a uniform and finally with a decelerating velocity. When the target figure stops at the starting point, the moving weight 8 has descended to its lowest position and the accelerating and braking weight 13 has once more ascended to its topmost position.

The purpose of the extra weight 16 is to keep the accelerating and braking rope 14 taut during the time when the respective weight 13 is in its lowermost position and the rope is slack.

In the embodiment depicted in FIG. 1 the figure 1 has been attached with the aid of a wire strung on support of the frame 2, with the aid of a weight 18. The apparatus further comprises a second pulley 19, around which the pulling rope 6 passes, as well as a pulley 20 from which the accelerating and braking rope 14 has been suspended.

Figure 4:
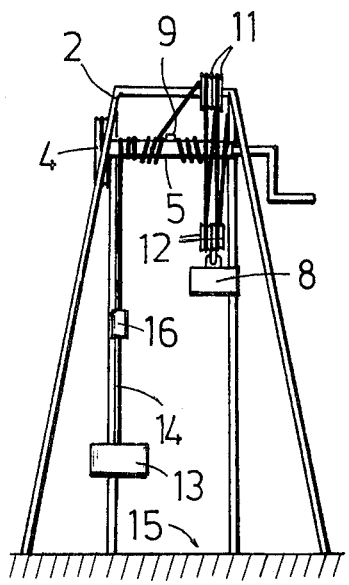
FIG. 4 shows the same drive means as FIG. 3 show viewed from one end.

In the embodiment of FIGS. 3 and 4 the accelerating and braking weight 13 has been directly suspended from the power shaft 5, and the pulling wire has been directly suspended from the pulley 3 and the power wheel 4.

The invention naturally is not confined to the examples presented, and its embodiments may vary within the scope of the claims following below. For instance, the block and tackle 10 may be replaced with an arbitrary power transmission known in prior art. Furthermore, the drive means of the invention may be connected not only to a shooting target carried by the wire presented in the embodiment example, but also to serve as drive means for a target-pulling carriage moving on rails. In this latter case the acceleration and braking of the target-pulling carriage may also partly or entirely be arranged to take place by means of varying the elevation of the rails. The apparatus may further comprise stopping and locking means for stopping the target figure and fixing it to be stationary e.g. between the motion paths of the figure.

What I claim is:

1. Drive means for moving a target figure intended for sports shooting which comprises: a frame; a pulley and a power wheel mounted on support of the frame; a power shaft connected to the power wheel; an endless pulling rope passing around the pulley and the power wheel having the figure affixed thereto; a weight rope; a moving weight connected to the power shaft by the aid of the weight rope, said moving weight being suspendable from the weight rope wound around the power shaft enabling gravity to act on the moving weight and move the figure by cooperative action of the weight rope, the power shaft and the power wheel, and of the pulling rope; a holding member disposed on said power shaft for winding the weight rope around the power shaft in one direction and, being adapted to change the direction of winding of the weight rope in the opposite direction by action on said rope by said holding member, whereby the moving weight suspended from the weight rope will move the target figure first in one direction while the weight rope is unwound from the power shaft up to the holding member, and in the opposite direction while the rope is unwound from the power shaft beyond the holding member in the opposite direction.

2. Drive means as recited in claim 1, wherein: the weight rope has been connected with the power shaft by means of a block and tackle, comprising upper and lower block and tackle pulleys, and the block and tackle has been suspended from the frame by the upper pulley and the moving weight has been suspended from the lower pulley.

3. Drive means as recited in claim 1, the drive means further comprising: an accelerating and braking weight with accelerating and braking rope and supporting base, said rope being connected with the power shaft and having such length that the accelerating and braking weight resides in its uppermost position above the supporting base when the accelerating and braking rope is wound around the power shaft and the figure is at the starting end of its path of motion and likewise in its uppermost position when the accelerating and braking rope is wound around the power shaft in the opposite direction and the figure is at the terminal end of its path of motion, and in its lower position when the figure is spaced by the length of the accelerating and braking distance from the initial or terminal end of its path of motion, repsectively.

4. Drive means as recited in claim 3, wherein: the moving weight has been chosen such that the gravity action on its mass is substantially equivalent to the constant speed drag of the drive means and the target figure combined.

5. Drive means as recited in claim 3, wherein the accelerating and braking rope is provided with an extra weight placed between the accelerating and braking weight and the end of the rope attached to the power shaft.

6. Drive means as recited in claim 3, wherein the power shaft is provided with a crank handle for turning the power shaft into desired position.

* * * * *